United States Patent [19]

Rotharmel et al.

[11] Patent Number: 5,111,917

[45] Date of Patent: May 12, 1992

[54] DAMPENER VALVING CONTROL MECHANISM

[75] Inventors: John Rotharmel, Vernon Hills; Paul Smeltzer, Naperville, both of Ill.

[73] Assignee: Maremont Corporation, Carol Stream, Ill.

[21] Appl. No.: 660,882

[22] Filed: Feb. 26, 1991

[51] Int. Cl.⁵ .............................................. B16F 9/44
[52] U.S. Cl. .................................. 188/319; 188/300; 267/64.12
[58] Field of Search ............... 188/299, 319, 279, 282, 188/300; 267/64.12; 74/111, 159, 167, 146

[56] References Cited

U.S. PATENT DOCUMENTS

| | | | |
|---|---|---|---|
| 3,407,909 | 10/1968 | Seckerson et al. | 188/300 |
| 4,128,152 | 12/1978 | Tschursch | 74/146 X |
| 4,183,509 | 1/1980 | Nishikawa et al. | 188/319 X |
| 4,476,967 | 10/1984 | Tetsuo | 188/319 |
| 4,800,995 | 1/1989 | Bernhardt et al. | 188/319 |

*Primary Examiner*—Joseph F. Peters, Jr.
*Assistant Examiner*—Carla Mattix
*Attorney, Agent, or Firm*—McAndrews, Held & Malloy, Ltd.

[57] ABSTRACT

A variable damping shock absorber is disclosed. The variable damping mechanism is activated by depression of a pin on the upper end of a shock absorber piston. Depression of the pin causes a spring loaded ratchet drive to engage a ratchet on a slide valve to alternatively ratchet the valve and slide the valve between an open and blocking position between two or more transverse flowways in the lower end of the shock.

12 Claims, 3 Drawing Sheets

FIG. 7 to an internal valving control mechanism within a damper for a vehicle. More particularly, this invention relates to an internal valving mechanism to control damping fluid in channels within the piston rod of a damper, such as a shock absorber or a MacPherson strut.

DAMPENER VALVING CONTROL MECHANISM

BACKGROUND

1. Field of the Invention

This invention relates to an internal valving control mechanism within a damper for a vehicle. More particularly, this invention relates to an internal valving mechanism to control damping fluid in channels within the piston rod of a damper, such as a shock absorber or a MacPherson strut.

2. Prior Art

In one typical suspension system for automobiles, shock forces are "absorbed" by a spring and shock absorber combination. The shock absorber consists of a rod and piston mounted within an outer cylinder, and the spring urges the rod to extend outwardly from the outer cylinder. Vibrations transferred from the vehicle wheel in contact with the road surface are "absorbed" by the compression and extension of the spring. Spring rebound and compressions, however, must be damped to prevent the spring from a series of extensions and contractions that would otherwise be caused by the vehicle wheels traversing road surface irregularities. Shock absorbers provide the damping needed.

One typical shock absorber has an oil cavity in the cylinder on each side of the piston within the cylinder. Compression of the shock absorber (as the spring and piston rod are compressed in response to contact of the wheel with the road) forces oil from one cavity into the other, and rebounding is subsequently damped by the resistance of oil flow in the "reverse direction as the piston is urged toward extension by the rebounding force of the spring. The valving within the piston and between the cavities thus provides the appropriate resistance to fluid flow between the two cavities.

For example, various types of check valves have been developed to allow fluid flow in compression (from the cavity beneath the piston through or around the piston head and into the outer cylinder reservoir cavity) more freely, i.e., with less resistance, than in extension (from the outer reservoir cavity and from the cavity surrounding the rod into the cavity beneath the piston). Such check valves thus provide greater damping when desired, during extension (rebound), rather than during compression shock absorption, when the shock absorber should compress relatively freely.

Improvements on this basic arrangement have provided varying damping characteristics for varying road conditions or vehicle speed, load, or acceleration. As a vehicle goes faster, for example, the damping should often be increased to counteract the increased forces that tend to reduce contact between the tire and the surface of the road.

One such variable damping shock absorber is shown in U.S. Pat. No. 4,527,676 issued Jul. 9, 1985 to Emura et al. The Emura patent discloses a shock absorber with variable damping accomplished by a motor rotating a four-way check valve in the shock. The motor is either (1) a step motor with four steps, one for each of the possible orientations of a four-way check valve, or (2) a feedback-controlled motor, with four arcuate electrical leads contacted by brushes to determine the exact position of the motor drive. Both types of motors are relatively complicated and expensive, as is the four-way valving associated with each.

For example, the Emura device requires a four-wire harness. Many of today's cars, however, are designed with harnesses having no more than two wires available for use by variable damping shock absorbers. Thus, the four-wire harness of Emura would require a costly re-design of wiring harnesses already existing and prevalent in the market.

Another problem with the Emura device is its relatively complicated and expensive motor mechanism. In the embodiment utilizing a four-way step motor, such motors are inherently complicated and expensive because they must be adapted to stop at each of four points, with appropriate electronics to maintain control of the position of the stop motor at each of its four stop positions.

In Emura's embodiment utilizing a feedback-controlled motor, the motor provides four-way stepping through a feedback control circuit which receives the feedback from mechanical wipers brushing over electrical contacts. These wipers and contacts wear and corrode over time, causing loss of electrical contact. Emura's variable damping mechanism can thus completely fail long before likely breakdown from any of the remaining components.

In addition, shock absorbers such as Emura necessarily require an electrical wire connection between the shock absorber internal structure and the external source of electrical energy. In the exposed and high impact area of a vehicle suspension type shock absorber, the wire leads from the vehicle to the shock absorber are thus at risk of corroding or breaking altogether.

OBJECTS OF THE INVENTION

It is thus an object of the invention to develop a simpler, more economical, and yet reliable internally valved variable damper.

It is yet another object to develop such a damper that does not require electrical components within the piston rod in the damper.

A further object is to provide a damper that can be easily switched between or among alternate levels of internal damping by simply depressing a rod, button, lever, etc., external of the piston rod in the damper.

Yet another object is to provide such a damper that need only have mechanical parts and thus need not have electrical parts or leads within the damper itself.

A further object is to develop such a shock absorber that does not necessarily require any wiring at all between a source of energy and the shock absorber itself.

Yet another object is to provide such a shock absorber that has at least three levels of damping achievable by simple depression of a button, lever, rod, etc.

There are other objects and advantages They will become apparent as the specification proceeds.

SUMMARY OF THE INVENTION

The foregoing and other objects and advantages are accomplished by our invention of an improved variable damper having an outer cylinder, a piston rod, and a ratcheting slide valve actuated by depression of a pin or like member in the shock. Depression of the pin forces the ratcheting slide valve to slide within a cavity in the shock and move a slide valve in the shock between a fluid passage blocking position and a fluid passage opened position. In one embodiment, the depression of the pin also rotates the ratcheting slide valve between various orientations to open and close different fluid passages in the piston rod.

BRIEF DESCRIPTION OF THE DRAWINGS

The preferred embodiment of the present invention is shown in the attached drawings wherein.

In the following description, applicant has used spacially orienting terms such "upper," "lower," "inwardly," and "outwardly." These terms are used only for ease of description to describe relative location of one component vis a vis another. They do not in any way limit the spacial orientation of the invention or its components to those orientations described.

DETAILED DESCRIPTION OF THE PREFERRED EMBODIMENT

Figure 1:
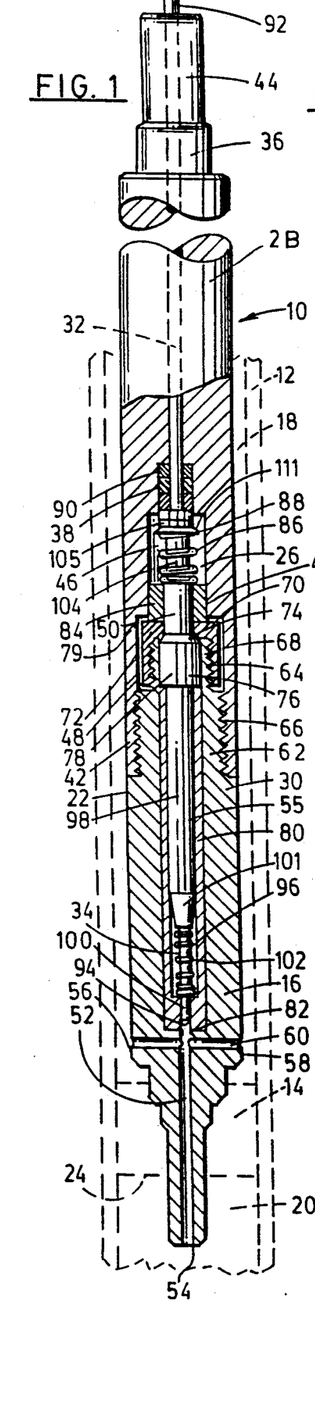
FIG. 1 is cross-sectional plan view of the improved internal variable damping valve within the shock absorber piston rod in the open or unblocked position and showing in phantom an outer cylinder surrounding the piston rod with a piston head secured at one end of the rod within the cylinder.

With reference to FIG. 1, the preferred embodiment of the present invention is used in a shock absorber, generally 10. The shock absorber 10 has an outer cylinder 12 (shown in partial cross-section in FIG. 1), a piston head 14 slidably disposed within the outer cylinder 12, and a piston rod 16 secured to the piston head 14. As is well known in the prior art, the piston head 14 and piston rod 16 may have internal passageways and valving to allow damping fluid to flow between an upper cavity 18 and lower cavity 20. The rebound or upper cavity 18 contains fluid between the outer cylinder 12 and external periphery 22 of the piston rod 16, and the lower cavity 20 contains fluid retained within the outer cylinder 12 and bottom side 24 of the piston head 14. The resistance to flow of fluid between the upper and lower cavities 18, 20 thus damps the movement of the piston head 14 and associated piston rod 16 within the cylinder 12. Valving within the piston head 14 or rod 16 thus can vary the flow of fluid from one cavity to the other and thus vary the level of damping in the shock absorber 10.

In the preferred embodiment, the piston rod 16 has an upper rod portion 28 and a lower rod portion 30. The upper portion 28 has an internal upper passageway 32 extending its entire axial length, and similarly the lower portion 30 has an internal lower passageway 34 extending through its entire axial length. The internal upper and lower passageways 32, 34 are coaxial and communicate with each other.

The upper cylindrical passageway 32 consists of a valve pin passage 36 in the uppermost end 44 of the piston rod 16, a cylindrical ring seal passage 38 communicating with the valve pin passage 36, a stepped cylindrical rachet guide passage 40 communicating with the ring seal passage 38, and an internally threaded lower cylindrical passage 42 communicating with the stepped ratchet guide passage 40. The stepped ratchet guide passage 40 has two sections: an upper cylindrical section 46 and a wider lower cylindrical section 48. The junction of the two sections 46, 48 thus constitutes a radially extending neck 50.

The lower axial passageway 34 in the lower rod portion 30 has a lower axial fluid flowway 52 extending axially upwardly from the lowermost end 54 of the lower rod portion 30 to communicate with a cylindrical and wider valve retaining passage 55. The lower axial fluid flowway 52 also intersects and communicates with transverse flowways 60 extending across the lower rod portion 30 to communicate with distal external sides 56, 58 of the lower rod portion 30. The transverse flowways 60 are intermediate the lowermost end of the valve retaining passage 55 and the lowermost end 54 of the lower external rod portion 30.

The upper end 62 of the lower rod portion 30 has stepped externally threaded sections 64, 66. The lower threaded section 66 has a wider diameter than the upper threaded section 64. The lower threaded section 66 is thus threadably secured to the mating internal threads on the lower cylindrical passage 42 of the upper rod portion 28.

The narrower upper externally threaded section 64 of the lower rod portion 30 is threadably secured to the reciprocally mating internal threaded section 68 on a ratchet guide retaining ring 70. The retaining ring 70 has a radially inwardly projecting upper neck 72, with a ratchet guide passage 74 extending axially through the neck 72. A ratchet guide 76 is disposed within the guide passage 74. The ratchet guide 76 has an enlarged lower cylindrical guide section 78 abutting the lowermost side of the neck 72 on the retaining ring 70. A narrowed cylindrical guide section 79 extends upwardly from the neck 72 and through the guide passage 74.

The lowermost edge of the ratchet guide 76 abuts a slide valve retaining tube 80. The retaining tube 80 is thus disposed within the internal cavity 26 between the ratchet guide 76 and a radially inwardly protruding retaining tube seat 82 above the transverse flowways 60. The seat 82 has a pin passage 94 in the axial center of the seat 82. The guide 76 and tube 80 cooperatively retain a lower slide valve pin 96, which has a widened cylindrical upper pin portion 98 and a narrowed cylindrical blocking rod 100 slidably penetrating the axial pin passage 94 in the retaining tube seat 82.

The uppermost edge of the ratchet retaining ring 70 abuts a spacer ring 84. In turn, the uppermost surface of the spacer ring 84 engages the lowermost surface of a ratchet guide biasing spring 86. The uppermost edge of the guide biasing spring 86 abuts a radially outwardly flared upper ring or abutment 88. In turn, the upper surface 111 of the flared upper ring 88 abuts the lower surface of flange 105 of ratchet drive 104. The upper surface of flange 105 abuts valve drive pin 92.

The spacer ring 84, biasing spring 86, flared upper ring 88, and seal rings 90 are disposed along the axis of the piston rod cavity 26. They thus cooperatively form a passage for slidable movement of an upper slide valve drive pin 92 within the internal cavity 26 while biasing the ratchet guide 76 downwardly in the cavity 26 away from the fixed flared ring 88 and, therefore, the uppermost end 44 of the piston rod 16.

The lowermost end 101 of the slide valve pin 98 is frusto-conical, with the narrowed blocking rod 100 extending downwardly therefrom. A slide valve spring 102 is disposed between the frusto-conical end 101 and the upper face of the retaining tube seat 82. The valve spring 102 biases the slidable conical end 101 and blocking rod 100 away from the tube seat 82 and therefore the transverse flowways 60 as well.

As shown in FIG. 1, the blocking rod 100 is distant from several transverse flowways 60. The transverse flowways 60 thus unrestrictably communicate with the axial fluid flowway 52. In this manner, damping fluid in the rebound or upper cavity 18 can flow through the transverse flowways 60, into the axial flowway 52, and then into the lower cavity 20.

Figures 2, 3:
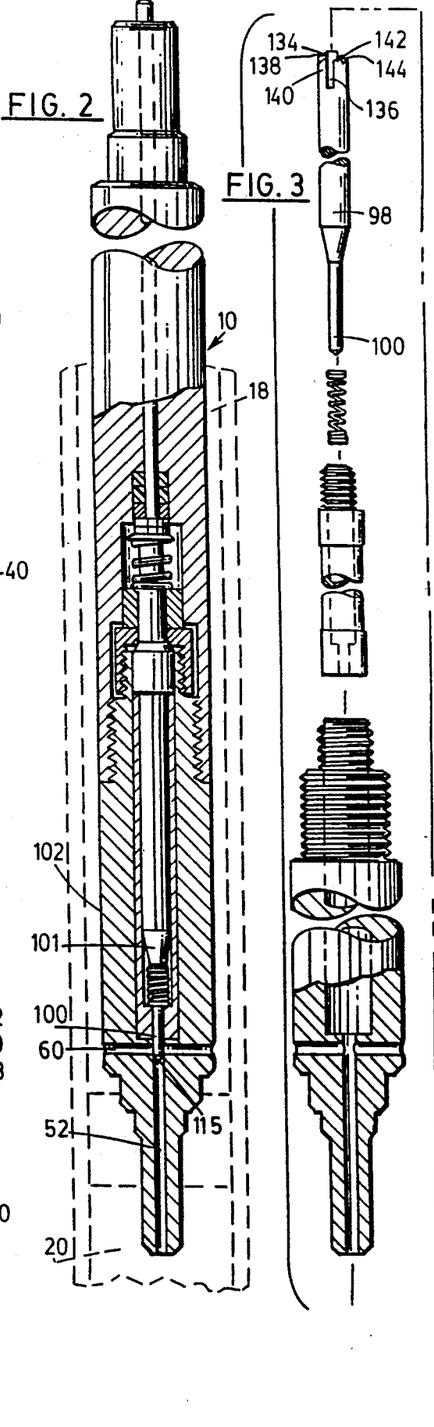
FIG. 2 is a side cross-sectional view of the improved variable damping valve, within the piston rod, in the blocking or closed position.
FIG. 3 is an exploded and partial cross-sectional view of the improved damping valve within the piston rod.

Applicants have developed two embodiments of the blocking rod 100 and the associated transverse flowways 60. On the first such embodiment, shown in FIG. 2, the blocking rod 100 is a solid cylindrical element with a conical lower end 151. As shown in FIG. 2, the conical end 101 of the slide valve pin 98 has compressed the valve spring 102 and moved the blocking rod 100 downwardly in the axial fluid flowway 52. The rod 100 thus fully penetrates the transverse flowways 60 to block any fluid communication between the transverse flowways 60 and the axial fluid flowway 52. In the FIG. 2 embodiment, these flowways 60 are diametrically opposed. In this manner, fluid cannot flow through the diametrical transverse flowways 60 and the axial fluid flowway 52, and damping fluid must thus use another route to flow between the upper cavity 18 and lower cavity 20. The level of damping in the shock absorber is thus increased over the level of damping provided by the unblocked or open flowpaths of FIG. 1.

Figure 6:
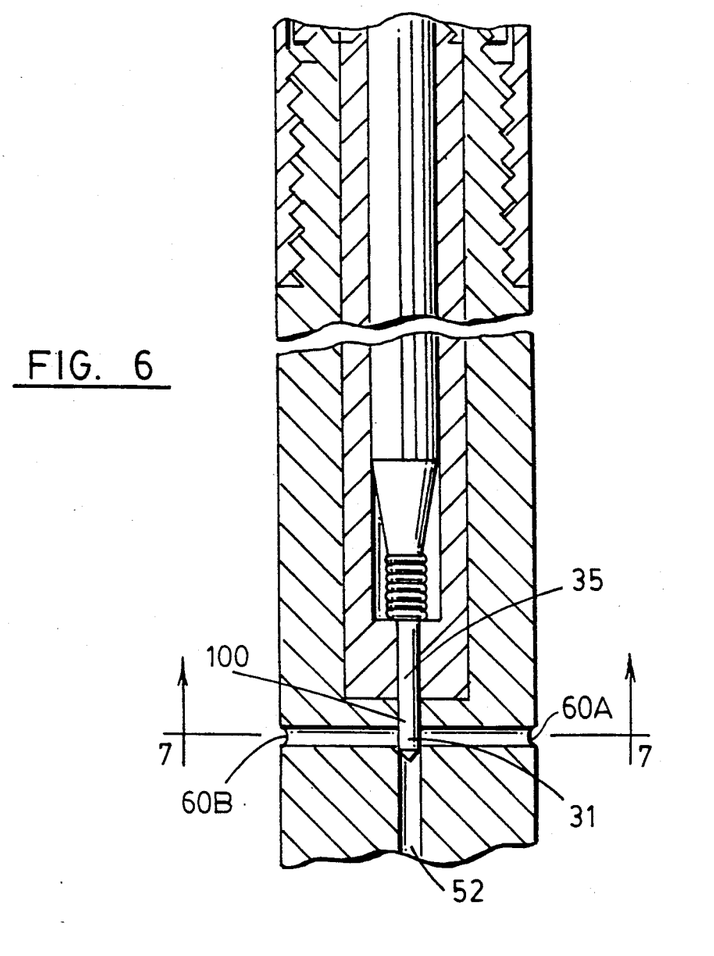
FIG. 6 is a partial side cross-sectional view of the improved variable damping valve showing an alternative valve having a valve blocking rod with a reduced cross-section blocking fluid flow to a fluid flowway and with radial flowways 60A and 60B each rotated 30° into the plane of the page.
Figure 7:
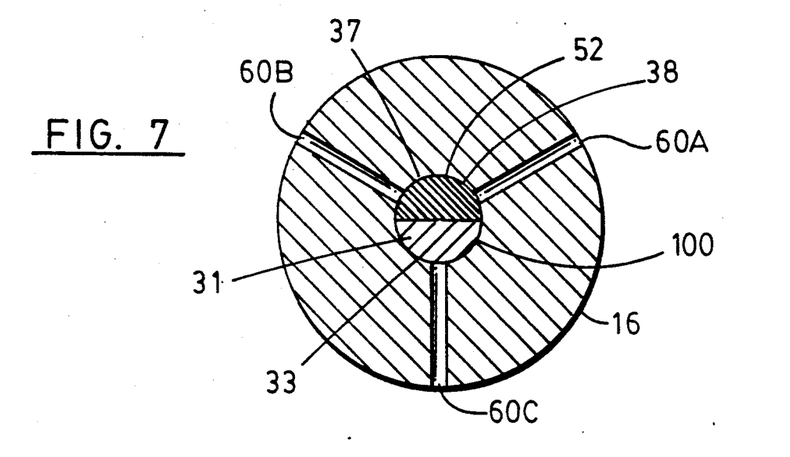
FIG. 7 a cross-sectional view of the piston rod of FIG. 7 taken along section line A—A and showing the blocking rod oriented to block only one of the three fluid flowways.

In the second embodiment of the blocking rod 100 and transverse flowways 60, as shown in FIGS. 6 and 7, three flowways 60A, 60B, 60C extend radially outwardly from the axial flowway 52. The axis of each flowway, 60A for example, is approximately 120 degrees to the axis of its adjacent flowways, 60B and 60C.

The blocking rod 100 has a lower end portion 31 with a reduced cross-section. The lower end portion 31 has a substantially circular cylindrical outer peripheral portion 33 that is coextensive with the cylindrical outer periphery of the upper portion 35 of the blocking rod 100. The solid cylindrical rod section 31, shown in FIG. 7, is bounded by the circular cylindrical surface 33 and by the intersecting, axially extending, chordal surface 38. The chordal surface 38 is positioned and dimensioned such that when blocking rod 100 is rotated about its longitudinal axis to a position as shown in FIG. 7 chordal surface 38 is perpendicular to one of the radial flow passages, such as 60C, and cylindrical surface 33 blocks that radial flow passage, the other two passages such as 60A and 60B are uncovered and in communication with the lower axial flow passage 52. Rotation of the blocking rod in either direction by 180° positions cylindrical surface 33 in blocking relation to radial passages 60A and 60B and uncovers the remaining radial flow passage 60C placing it in communication with the lower axial flow passage 52.

Figure 4:
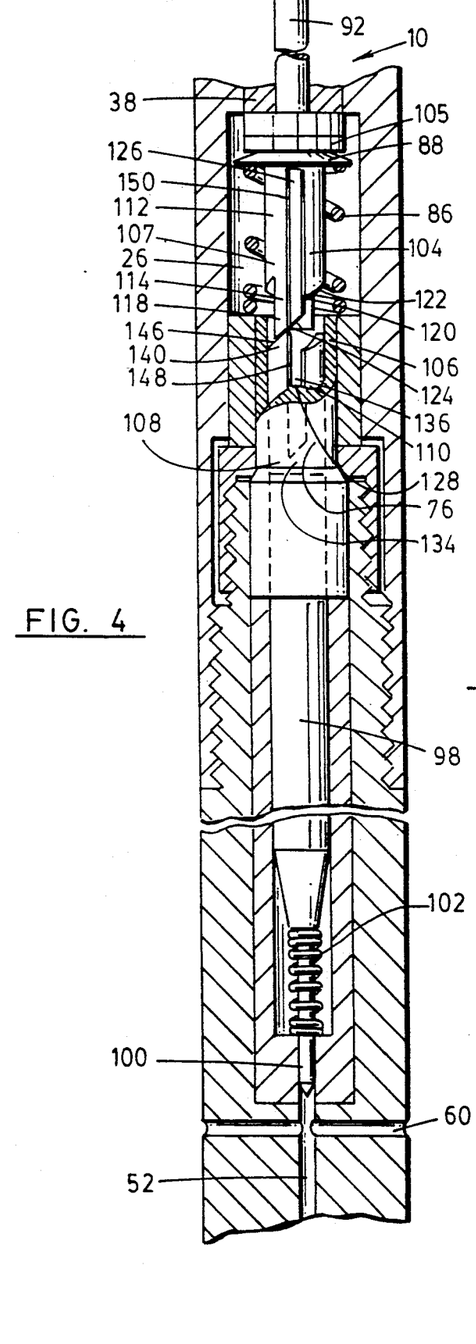
FIG. 4 is a partial cross-sectional view of the valve within the piston rod showing in particular the ratcheting mechanism of the valve when the valve is in the open position.
Figure 5:
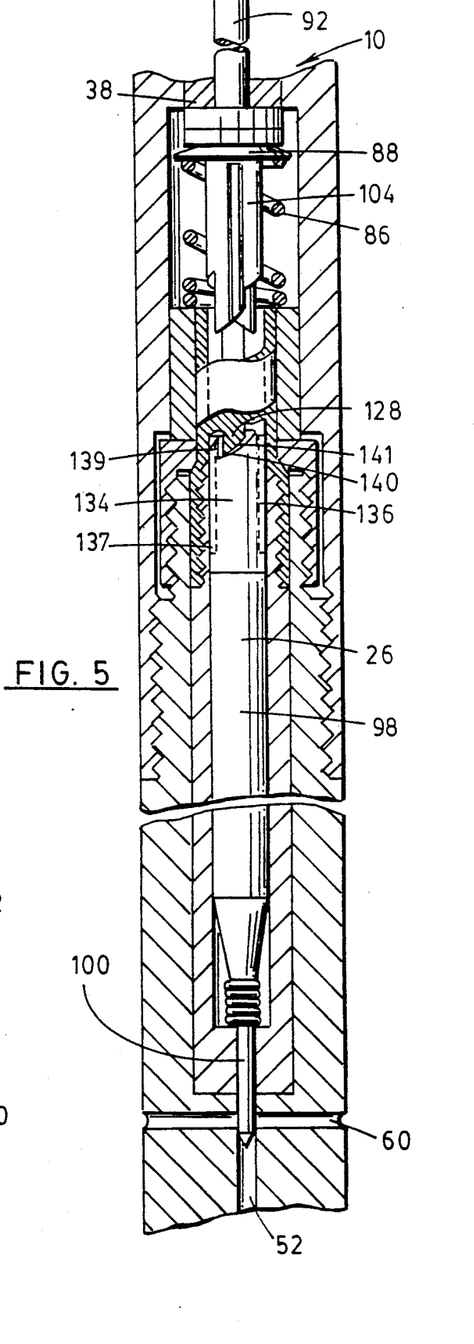
FIG. 5 is a partial cross-sectional view of the valve within, the piston rod showing in particular the ratcheting mechanism of the valve when the valve is in the closed position.

The blocking rod 100 rotates about its longitudinal axis each time the slide valve drive pin 92 is depressed. The drive pin 92 is initially in a blocking position as shown in FIG. 5, and as explained within, a single depression of the pin 92 will cause the rod 100 to retract as shown in FIG. 4. In so doing, the rod 100 will have rotated about its axis through approximately 90 degrees. If the drive pin 92 is depressed a second time the rod 100 again is positioned as shown in FIG. 5; however, it will now have rotated 180 degrees from its initial orientation prior to the first depression of the pin.

As a result, in the initial orientation the passages or flowways 60A and 60B were uncovered and open to fluid flow from or to the axial flowway 52. After the first depression of the pin 92, the blocking rod 100 remains in the retracted position, as shown in FIG. 4, opening all three flowways 60A, 60B, 60C. After the second depression of the pin 92, the blocking rod 100 will have rotated 180 degrees from the initial position shown in FIG. 7, thereby blocking flowways 60A and 60B and permitting radial flow through flowway 60C only. In this manner, the valving provides three levels of damping achievable by depression of the pin 92.

With reference now to FIG. 4, the upper end 106 of the ratchet guide 76 cooperates with a ratchet drive 104, and the lower guide end 108 cooperates with a ratchet end 110 on the slide valve 98. The cooperative engagement of the ratchet guide 76, ratchet drive 104, and ratchet end 110, moves the slide valve 98 to alternately slide the blocking rod 100 between the two positions, open (as in FIG. 4) and closed (as in FIG. 5) upon each ratcheting depression of the drive pin 92 downwardly toward the slide valve 98.

As shown in FIG. 3, the ratchet drive 104 has an upper flanged end 105, a lower ratcheting end 107, and a drive pin detent 108 in its upper flanged end 105. The flared upper ring 88 has a central ratchet drive passage 113, and the upper face 111 of the ring 88 abuts the lowermost edge of the upper flanged end 105. As shown in FIG. 4, the ring 88 is thus secured in this position by the biasing spring 86.

Referring back to FIG. 3, the ratchet drive 104 has a substantially cylindrical body 112 intermediate the flanged upper end 105 and two downwardly protruding, diametrically opposing lugs 114, 116. As shown in FIG. 4, each such lug has an axially flattened edge 118 and a substantially helical, two-stepped edge 120. Intermediate the upper stepped portion 122 and the lower stepped portion 124 on the edge 120 is a guide slot 126 penetrating the edge 120, extending axially upwardly, and terminating adjacent but spaced somewhat from the upper end 105 of the ratchet drive 104.

As shown in FIG. 3, the upper cylindrical section 79 of the ratchet guide 76 has two diametrically opposing drive pin guide bars 128, 129 (129 not shown in FIG. 3) extending axially and radially inwardly from the inner periphery of the upper section 79. Each such guide bar 128 extends from the upper edge 130 of the ratchet guide 76 downwardly adjacent, but somewhat spaced from, the lower cylindrical section 78 of the ratchet guide 76. The lower most edge 132 of the guide bar 128 is helical and of the same general shape as the upper stepped helical portion 122 and lower stepped helical portion 124 on the two-stepped edge 120, of ratchet drive 104.

Referring again to FIG. 3, the lower slide valve pin 98 has an upper ratchet end 134 opposite its lower blocking rod end 100. Two diametrically opposed ratchet end guide slots 136, 137 (137 not shown in FIG. 3) penetrate the outer cylindrical periphery of the ratchet end 134 and extend axially downwardly toward the blocking rod end 100.

Also penetrating the outer cylindrical periphery of the ratchet end 134 are four axially upwardly extending slide ratchet lugs 138, 140, 142, 144. Two of the lugs 138, 140 are adjacent each other and disposed on one side of the periphery between the two opposing guide slots 136, 137; the other two lugs 142, 144 are adjacent each other and disposed on the other side of the periphery between the two opposing guide slots 136, 137.

Referring back to FIG. 4, each of the lugs, 140 for example, has a helical upper edge 146 abutting an axially extending edge 148 extending downwardly from the ratchet end 134. The axial edge 148 of the lug 140 abutting a ratchet drive lug, such as 114, is coextensive with the axial edge 150 of the drive slot 126. At the same time, the helical edge 146 of the lug 140 has substantially the same helical shape as that on the upper and lower stepped portions 122, 124 on the ratchet drive 104.

As shown in FIGS. 4 and 5, the ratchet end drive slots 136, 137 of the slide valve pin and diametrically opposing ratchet drive guide slots 126, 127 mate with the guide bars 128, 129 to limit rotational movement of the ratchet end 134 with respect to the ratchet drive 104 within the ratchet guide 76. At the same time, the helical edges, 124 for example, on the ratchet drive 104 engage the mating helical edges, 146 for example, on the ratchet end 134.

Thus, depression of the drive pin 92 forces upper ring 88 and ratchet drive 104 downwardly. In turn, the ratchet drive 104 forces the ratchet end 134 axially downwardly along the linear path allowed by the guide bars 128, 129. When, however, the upper helical edge, 146 for example, of a ratchet end lug 140 mates with bottom mating helical edge 141 of a guide bar 128, the upward biasing pressure of the slide valve spring 102 forces the ratchet and lug's upper helical edge 146 to rotate into mating engagement, as shown in FIG. 5, with the bottom helical edge 141 of the guide bar 128. As the ratchet guide spring 86 urges the pin 92, ring 88, and ratchet drive 104 back upward to seat against the seals 38, the ratchet end 134, and thus the entire slide valve 98, is retained downwardly in the internal cavity 26 so that the blocking rod 100 blocks the intersection of the transverse and axial flowways 52, 60.

On the other hand, depression of the drive pin 92 once more forces ratchet end 134 downwardly along the same linear path until an adjacent helical edge 139 mates with the bottom edge 141 of the guide bar 128. At that point, the same upward spring pressure forces the ratchet end 134 to again rotate into sliding mating contact of the helical edges 139, 141 until the bottom helical edge 141 on the guide bar 128 penetrates an adjacent guide slot 137. The spring pressure then forces the ratchet end 134 upward as the guide bar 128 slides within the upwardly moving guide slot 137. Finally, the ratchet end 134 will have moved as far upwardly as allowed by the guide slot 137 and mating guide bar 128. The blocking rod 100 is thus slid upward in the axial flowway 52 to open communication of all transverse flowways 60 with the axial flowway 52, as shown in FIG. 1.

In the FIG. 2 embodiment, communication of the flowways 60 and 52 is thus quickly, easily, and reliably alternately opened and closed by depression of the drive pin 92. In the FIG. 6-7 embodiment, the level of communication can be adjusted even further, with at least three levels of fluid flow, by depression of the drive pin 92. Even further levels of fluid flow can be achieved in the FIG. 6-7 type of embodiment by varying the widths of the flowways 60A, 60B, and 60C with respect to each other and configuring ratchet drive, guide and slide to provide 60° rotation of the slide valve with each depression of push rod 92.

Moreover, in all of the above types of embodiments, the mechanism accomplishing the opening, closing, or partial closing of the valving within the piston rod 16 is completely mechanical with no electrical parts or wiring in the rod 16 at all. The mechanism thus provides economical and reliable internal valving control in a damper for a vehicle. Moreover, the mechanism can allow multiple levels of damping by (1) merely changing the cross-sectional configuration of a rod element; (2) the arrangement and number of associated radial flowways, or (3) the relative widths of the flowways.

While in the foregoing, the applicant has described the preferred embodiment, the description is illustrative. The scope of the invention is thus determined by reference to the following claims.

What is claimed is:

1. An improved variable damping shock absorber, the improvement comprising in combination:
   (A) an outer cylinder having a piston passage penetrating one end of the cylinder;
   (B) a piston rod having one retained end slidably disposed within the outer cylinder, an intermediate section extending from the retained end through the piston passage in the outer cylinder and terminating in an external end external to the cylinder, an internal cavity extending within the piston rod, and at least one fluid passage providing means for fluid communication between the internal cavity and the outer periphery of the piston rod disposed within the outer cylinder;
   (C) push means slidably penetrating the internal cavity;
   (D) a slide valve slidably penetrating the internal cavity and having: (i) a valving end slidable to penetrate the fluid passage, and (ii) a ratchet end opposite the valving end; and
   (E) a spring loaded ratcheting means for simultaneously urging the valving end of the slide valve axially away from the fluid passage, urging the push means axially outwardly of the internal cavity, and translating axial motion of the push means inwardly of the internal cavity into rotational and axial motion of the ratchet end of the slide valve whereby the valving end alternately slides between: (i) a blocking position at least partially obstructing the fluid passage upon a first axial motion of the push means axially inwardly of the internal cavity; and (ii) an opened position, reducing blocking penetration of the fluid passage, upon a second axial motion of the push rod axially inwardly toward the internal cavity.

2. The improved variable damping shock absorber of claim 1 wherein the ratcheting means includes:
   (a) a ratchet drive section intermediate and adjacent the push means and the slide valve;

(b) a ratchet end on the end of the slide valve adjacent the ratchet drive;

(c) a ratchet guide disposed within the internal cavity to provide means to guide the ratchet drive section into cooperative contact with the ratchet end whereby the ratchet end slides between a first locked position and a second locked position upon depression of the push means toward the internal cavity; and (d) spring means for simultaneously: (i) biasing the valving end of the slide valve axially away from the fluid passage and (ii) biasing the push means axially away from the internal cavity.

3. The improved variable damping shock absorber of claim 2 wherein:

(a) the internal cavity has a first cavity spring abutment and a second cavity spring abutment;

(b) the push means has a push spring abutment;

(c) the slide valve has a slide spring abutment;

(d) the spring means includes:

(i) a first spring abutting the first cavity spring abutment on one end and the push spring abutment on the other; and (ii) a second spring abutting the second cavity spring abutment on one end and the slide spring abutment on the other, whereby the first spring biases the push means axially outwardly of the internal cavity, and the second spring biases the slide valve axially away from the fluid passage.

4. The improved variable damping shock absorber of claim 2 wherein:

(a) the ratchet drive has a push means passage extending along its axial length, a drive guide slot penetrating the outer periphery of the ratchet drive, and at least one axially extending drive ratchet lug extending from the outer periphery of the ratchet drive, the drive ratchet lug having an axially flattened edge and a helical edge with the guide slot extending from the helical edge;

(b) the ratchet end on the slide valve includes a slide valve guide slot penetrating the outer periphery of the ratchet end, and at least two axially extending slide ratchet lugs extending from the outer periphery of the ratchet end, each such slide ratchet lug having an axially flattened edge and a helical edge with the guide slot penetrating one of the two slide ratchet lugs; and (c) the ratchet guide has an axially extending guide passage and at least one axially extending guide ridge projecting radially inwardly from the internal surface of the guide passage, the ratchet drive section and ratchet end both slidably penetrating the guide passage.

5. The improved variable damping shock absorber of claim 3 wherein:

(a) the ratchet drive has a push means passage extending along its axial length, a drive guide slot penetrating the outer periphery of the ratchet drive, and at least one axially extending drive ratchet lug extending from the outer periphery of the ratchet drive, the drive ratchet lug having an axially flattened edge and a helical edge with the guide slot extending from the helical edge;

(b) the ratchet end on the slide valve includes a slide valve guide slot penetrating the outer periphery of the ratchet end, and at least two axially extending slide ratchet lugs extending from the outer periphery of the ratchet end, each such slide ratchet lug having an axially flattened edge and a helical edge with the guide penetrating one of the two slide ratchet lugs; and (c) the ratchet guide has an axially extending guide passage and at least one axially extending guide ridge projecting radially inwardly from the internal surface of the guide passage, the ratchet drive section and ratchet end both slidably penetrating the guide passage.

6. The improved variable damping shock absorber of claim 1 wherein:

(a) the piston rod has at least two fluid passages; and (b) the slide valve has a reduced cross-section portion comprising a blocking periphery and a narrowed section; and (c) the ratcheting means rotates the valving end of the slide valve upon each axial motion of the push means axially inwardly of the internal cavity, whereby the blocking periphery blocks two fluid passages upon a first depression of the push means and, upon a subsequent depression of the push means, no longer blocks both of the fluid passages.

7. The improved variable damping shock absorber of claim 2 wherein:

(a) the piston rod has at least two fluid passages; and (b) the slide valve has a reduced cross-section portion comprising a blocking periphery and a narrowed section; and (c) the ratcheting means rotates the valving end of the slide valve upon each axial motion of the push means axially inwardly of the internal cavity, whereby the blocking periphery blocks two fluid passages upon a first depression of the push means and, upon a subsequent depression of the push means, no longer blocks both of the fluid passages.

8. The improved variable damping shock absorber of claim 3 wherein:

(a) the piston rod has at least two fluid passages; and (b) the slide valve has a reduced cross-section portion comprising a blocking periphery and a narrowed section; and (c) the ratcheting means rotates the valving end of the slide valve upon each axial motion of the push means axially inwardly of the internal cavity, whereby the blocking periphery blocks two fluid passages upon a first depression of the push means and, upon a subsequent depression of the push means, no longer blocks both of the fluid passages.

9. The improved variable damping shock absorber of claim 4 wherein:

(a) the piston rod has at least two fluid passages; and (b) the slide valve has a reduced cross-section portion comprising a blocking periphery and a narrowed section; and (c) the ratcheting means rotates the valving end of the slide valve upon each axial motion of the push means axially inwardly of the internal cavity, whereby the blocking periphery blocks two fluid passages upon a first depression of the push means and, upon a subsequent depression of the push means, no longer blocks both of the fluid passages.

10. The improved variable damping shock absorber of claim 5 wherein:

(a) the piston rod has at least two fluid passages; and (b) the slide valve has a reduced cross-section portion comprising a blocking periphery and a narrowed section; and (c) the ratcheting means rotates the valving end of the slide valve upon each axial motion of the push means axially inwardly of the internal cavity, whereby the blocking periphery blocks two fluid passages upon a first depression of the push means and, upon a subsequent depression of the push means, no longer blocks both of the fluid passages.

11. The improved variable damping shock absorber of claim 10 wherein:
   (a) the slide valve is constructed having a blocking periphery sized to block two fluid passages and is positioned within the internal cavity so that the blocking periphery blocks two fluid passages in a first blocking position upon a first depression of the push means; and
   (b) the ratcheting means is constructed to rotate the slide valve within the internal cavity such that successive blocking positions of the slide valve are separated by a predetermined angular displacement of the slide valve that will cause the slide valve to return to the first blocking position after one complete rotation of the slide valve du to a predetermined number of depressions of the push means and the blocking periphery will not block the two fluid passages blocked by the slide valve in the first blocking position in at least one of the successive blocking positions whereby a plurality of damping levels may be obtained by the uncovered passages in the open position and the first and successive blocking positions.

12. The improved variable damping shock absorber of claim 5 wherein:
   (a) the piston rod has at least three passages communicating with the internal cavity at locations wherein more than half of the passages communicate with the internal cavity within less than half the circumference of the internal cavity;
   (b) the slide valve has a reduced cross-section portion comprising a blocking periphery and a narrowed section and the blocking periphery is sized to obstruct approximately half of the circumference of the internal cavity;
   (c) the ratcheting means rotates the valving end of the slide valve upon each axial motion of the push means axially inwardly of the internal cavity such the that successive blocking positions of the slide valve are separated by approximately one half of a full rotation wherein the slide valve alternately attains a first blocking position and a second blocking position on successive blocking positions; and
   (d) the slide valve is positioned within the internal cavity so that the blocking periphery of the slide valve obstructs more than half of the passages in the first blocking position and less than half the passages in the second blocking position whereby three damping levels may be obtained by uncovering all passages in the open position, covering more than half the passages in the first blocking position and covering less than half the passages in the second blocking position.

\* \* \* \* \*

UNITED STATES PATENT AND TRADEMARK OFFICE
CERTIFICATE OF CORRECTION

PATENT NO. : 5,111,917
DATED : May 12, 1992
INVENTOR(S) : John Rothärmel and Paul Smeltzer It is certified that error appears in the above-identified patent and that said Letters Patent is hereby corrected as shown below:

—Column 3, line 31, A-A should be 7-7

—Column 5, line 29, numeral 151 should be 115
Column 11:
—Claim 11, line 23, du should be "due"
On drawing sheets:
—Figure 1, upper rod portion identified as 2B should be 28

—Figure 1, the leader line on numeral 36 should be extended to touch the valve pin passage, reference column 4, line 8

—Figure 3, leader line on numeral 114 is correct but the leader line on numeral 116 does not identify the diametrically disposed lug. See reference at column 6, line 48

—Figure 4, the leader line from (118) does not terminate at the axially flatted edge. See column 6, line 49

—Figure 7, the leader line from numeral 38 does not terminate at the chordal surface of the blocking rod (100).

Signed and Sealed this

Seventh Day of December, 1993

Attest:

BRUCE LEHMAN

*Attesting Officer*  *Commissioner of Patents and Trademarks*